(12) United States Patent
Voelz

(10) Patent No.: US 8,763,853 B2
(45) Date of Patent: Jul. 1, 2014

(54) DEVICE FOR PROVIDING CONNECTION ELEMENTS

(75) Inventor: Mathias Voelz, Oldenburg (DE)

(73) Assignee: Broetje Automation GmbH, Wiefelstede (DE)

( * ) Notice: Subject to any disclaimer, the term of this patent is extended or adjusted under 35 U.S.C. 154(b) by 242 days.

(21) Appl. No.: 13/290,258

(22) Filed: Nov. 7, 2011

(65) Prior Publication Data

US 2012/0138627 A1 Jun. 7, 2012

(30) Foreign Application Priority Data

Dec. 3, 2010 (DE) .......................... 10 2010 053 220

(51) Int. Cl.
*B21J 15/32* (2006.01)
(52) U.S. Cl.
USPC ............ 221/197; 221/278; 227/112; 227/109
(58) Field of Classification Search
USPC ............ 221/197, 278, 165, 298, 95; 227/112, 227/111, 110, 107, 109, 119
See application file for complete search history.

(56) References Cited

U.S. PATENT DOCUMENTS

| | | | | |
|---|---|---|---|---|
| 5,193,717 A * | 3/1993 | Rink et al. | ..................... | 221/233 |
| 5,242,080 A * | 9/1993 | Kroon et al. | ................... | 221/113 |
| 5,385,434 A | 1/1995 | Quinn et al. | | |
| 5,465,868 A * | 11/1995 | Bonomi | ........................ | 221/165 |
| 5,472,087 A * | 12/1995 | Rink et al. | ..................... | 206/341 |
| 6,688,489 B2 * | 2/2004 | Bloch et al. | ...................... | 221/88 |
| 6,692,213 B1 * | 2/2004 | Butler | ........................... | 414/412 |
| 6,796,454 B1 * | 9/2004 | Matthews et al. | ............. | 221/197 |
| 6,944,944 B1 * | 9/2005 | Craythorn et al. | .............. | 29/798 |
| 6,951,298 B1 | 10/2005 | Cogley et al. | | |
| 6,959,835 B2 * | 11/2005 | Bloch et al. | ................... | 221/278 |
| 7,040,506 B2 * | 5/2006 | Bloch et al. | ................... | 221/278 |
| 7,882,981 B2 * | 2/2011 | Auriol et al. | .................. | 221/278 |
| 8,046,898 B2 * | 11/2011 | Bloch et al. | ................ | 29/525.01 |
| 2005/0006427 A1 | 1/2005 | Bloch et al. | | |
| 2005/0284827 A1 * | 12/2005 | Auriol et al. | ................. | 211/26.2 |

FOREIGN PATENT DOCUMENTS

| | | |
|---|---|---|
| EP | 0 691 177 | 1/1996 |
| EP | 1 531 966 | 5/2005 |
| FR | 2 842 181 | 1/2004 |
| JP | 54-102669 | 8/1979 |
| WO | 00/47350 | 8/2000 |

* cited by examiner

*Primary Examiner* — Patrick Mackey
(74) *Attorney, Agent, or Firm* — Michael J. Striker

(57) ABSTRACT

A device for providing connection elements, such as rivets and the like has a storage unit with at least one outlet, two stacked, replaceable cartridges each having at least one output flange for dispensing connection elements, and a cartridge guide and a detachable cartridge lock assigned to each cartridge which for its installation is slideable via the cartridge guide to an operating position and fixable by the cartridge lock assigned to the cartridge guide and engaged with the cartridge for locking.

12 Claims, 7 Drawing Sheets

DEVICE FOR PROVIDING CONNECTION ELEMENTS

CROSS-REERENCE TO RELATED APPLICATION

The invention described and claimed hereinbelow is also described in German Patent Application DE 10 2010 053 220.7 filed on Dec. 3, 2010. This German Patent Application, whose subject matter is incorporated here by reference, provides the basis for a claim of priority of invention under 35 U.S.C. 119(a)-(d). Further, the content of the present application is related to the content of U.S. application Ser. No. 13/295,571, Nov. 14, 2011 and U.S. application Ser. No. 13/290,306, filed Nov. 7, 2011.

BACKGROUND OF THE INVENTION

The present invention relates to a device for providing connection elements, which provides rivet elements or the like.

Rivet connections have played an important role for many years in the aviation industry in particular. The automation of riveting applications is becoming increasingly significant since aircraft components are becoming increasingly larger.

In addition to carrying out riveting applications using rivet tools, providing rivet elements specifically and rapidly via related motion control poses a particular challenge to system manufacturers.

A known device for providing rivets (EP 1 531 966 B1) is equipped with a rivet storage unit designed as a cartridge cabinet comprising a number of rivet cartridges stacked one above the other. Using a transfer carriage which can be moved along the rivet cartridges, rivet elements are transferred from the particular rivet cartridge that has arrived to a rivet outlet.

The rivet cartridges of the known devices for providing rivets can be replaced manually from the front side of the device for providing rivets, in particular when the rivet supply in the rivet cartridge has been fully consumed. To this end, the rivet cartridges can be slid into an operating position via a cartridge guide. A cartridge lock is assigned to each rivet cartridge to fix the rivet cartridges in the particular operating position.

The cartridge lock is usually assigned to a front-side frame of the device for providing rivets. The cartridge lock must be oriented exactly when first installed for the cartridge lock to be positioned exactly relative to the rivet cartridge. The reason for this is that the known system has very considerable tolerances between the front-side frame and the rest of the device for providing rivets, in particular the cartridge guide.

SUMMARY OF THE INVENTION

Accordingly, it is an object of the present invention to provide a device for providing connection elements, which avoids the disadvantages of the prior art.

The problem addressed by the invention is that of achieving exact positioning of the cartridge lock relative to the particular rivet cartridge using minimal structural complexity.

An essential aspect of the present invention is the premise of assigning the cartridge look to the cartridge guide which always determines the position of the rivet cartridge with one degree of freedom of motion. Provided the configuration is suitable, orientation of the cartridge lock can be omitted, thereby reducing production costs to a considerable extent.

In the preferred embodiments, the cartridge lock presses the rivet cartridge in the locked state against a stationary cartridge stop. It is thereby made even easier to attain the exact operating position of the rivet cartridge.

In another embodiment that is particularly advantageous in regard to the resulting compactness, a linear actuator, in particular a pneumatic actuator, which interacts with a locking mechanism is provided.

The invention is explained below in greater detail with reference to a drawing that depicts only one embodiment. The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
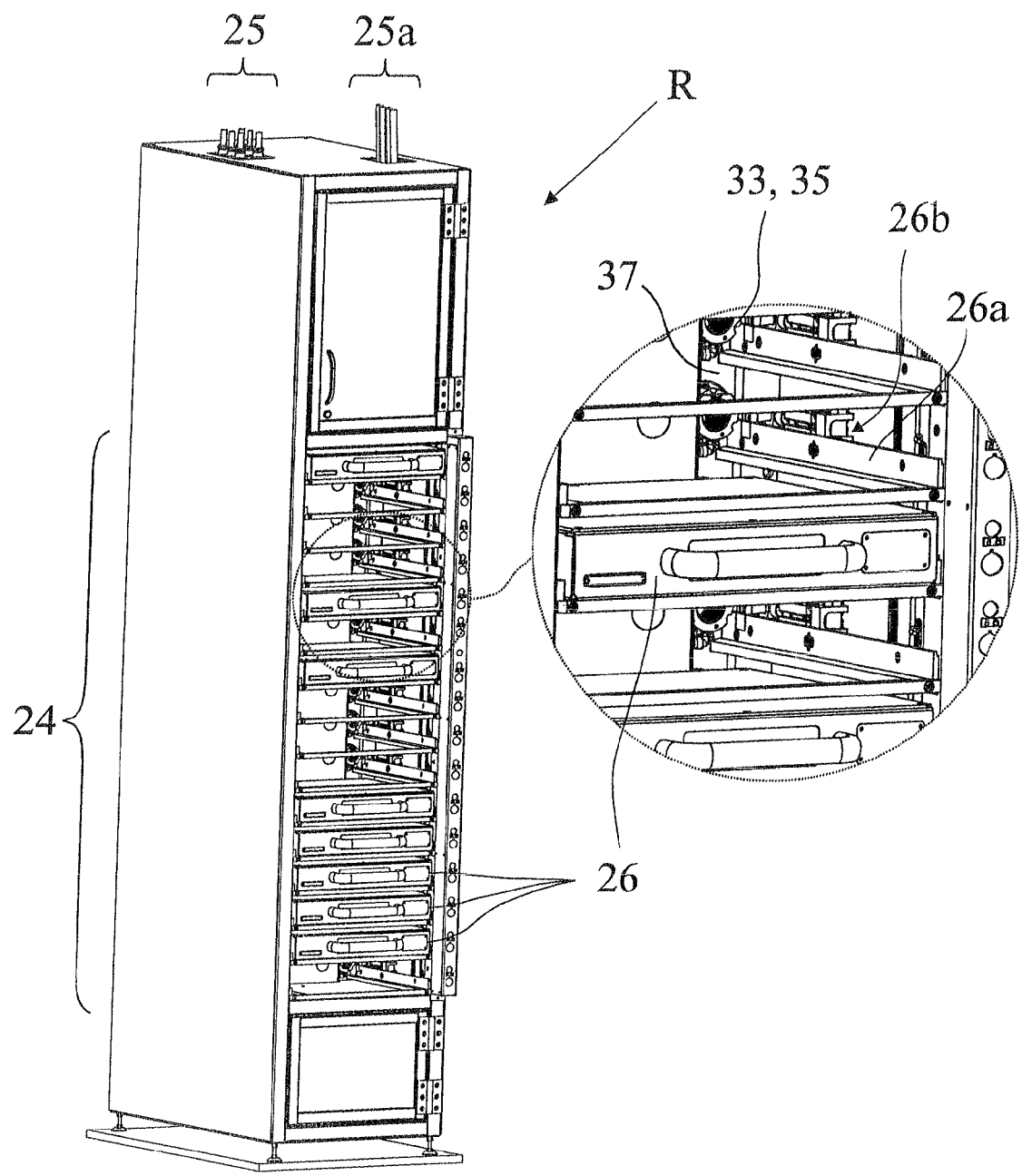
FIG. 1 shows a device for providing rivets according to the invention, in a perspective view at a slant from the front.

The device for providing connection elements such as rivets R depicted in the drawings is used to automatically provide rivet elements 1 or the like. The term "rivet element" has broad meaning and includes all possible connection elements designed similar to rivets in any possible manner.

When used as intended, rivet elements 1 stored in the device for providing rivets R are preferably transferred to a rivet control, are received by the rivet control, and are transported further to the particular rivet application.

The device for providing rivets R is preferably equipped with an entirely special rivet control. An explanation of the preferred design thereof will now be presented in the sense of a complete depiction.

The rivet control serves very generally as the motion control of rivet elements 1 or the like. The motion control of rivet elements 1 comprises active driving of rivet elements 1 and passive blocking or release of rivet elements 1. In the context of an above-described device for providing rivets R, the rivet control preferably has the function of receiving and forwarding rivet elements 1, as will be shown. The term "motion control" therefore also has broad meaning.

Figure 3:
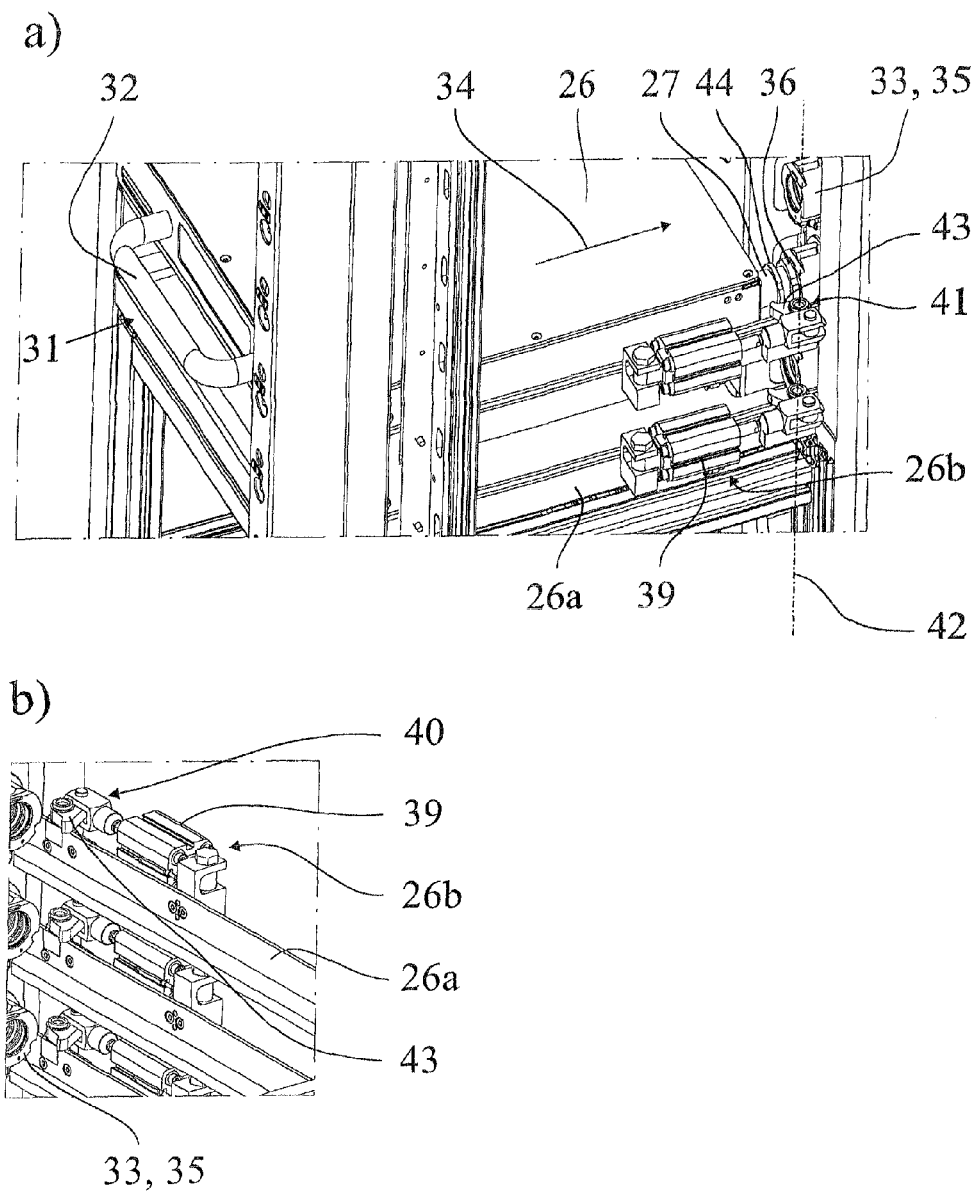
FIG. 3 shows the cartridge locks of the device for providing rivets according to FIG. 1 a) in the locked state and b) in the unlocked state, both in a perspective view.
Figure 4:
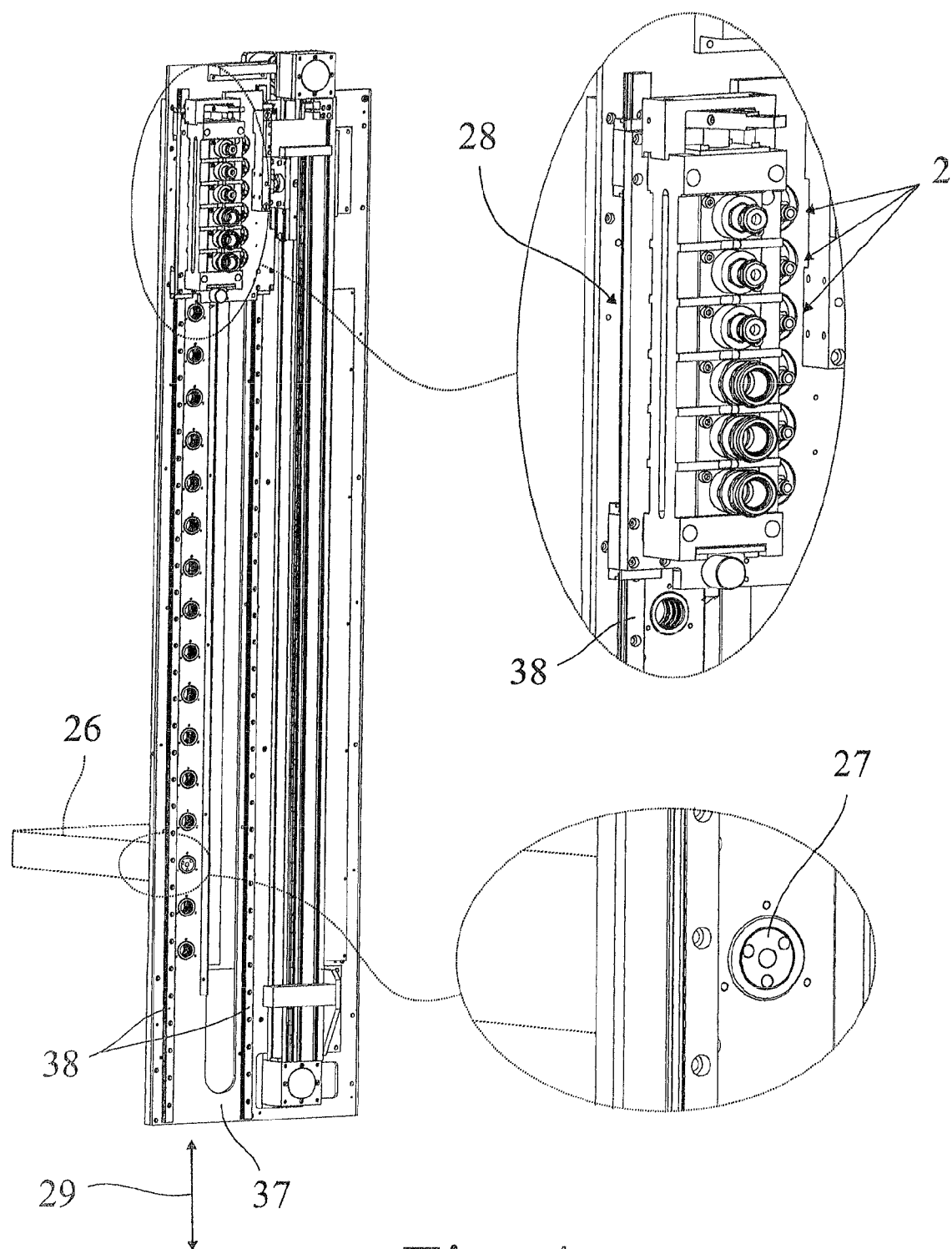
FIG. 4 shows a central supporting plate of the device for providing rivets according to FIG. 1 with transfer carriage installed, in a perspective view.
Figure 5:
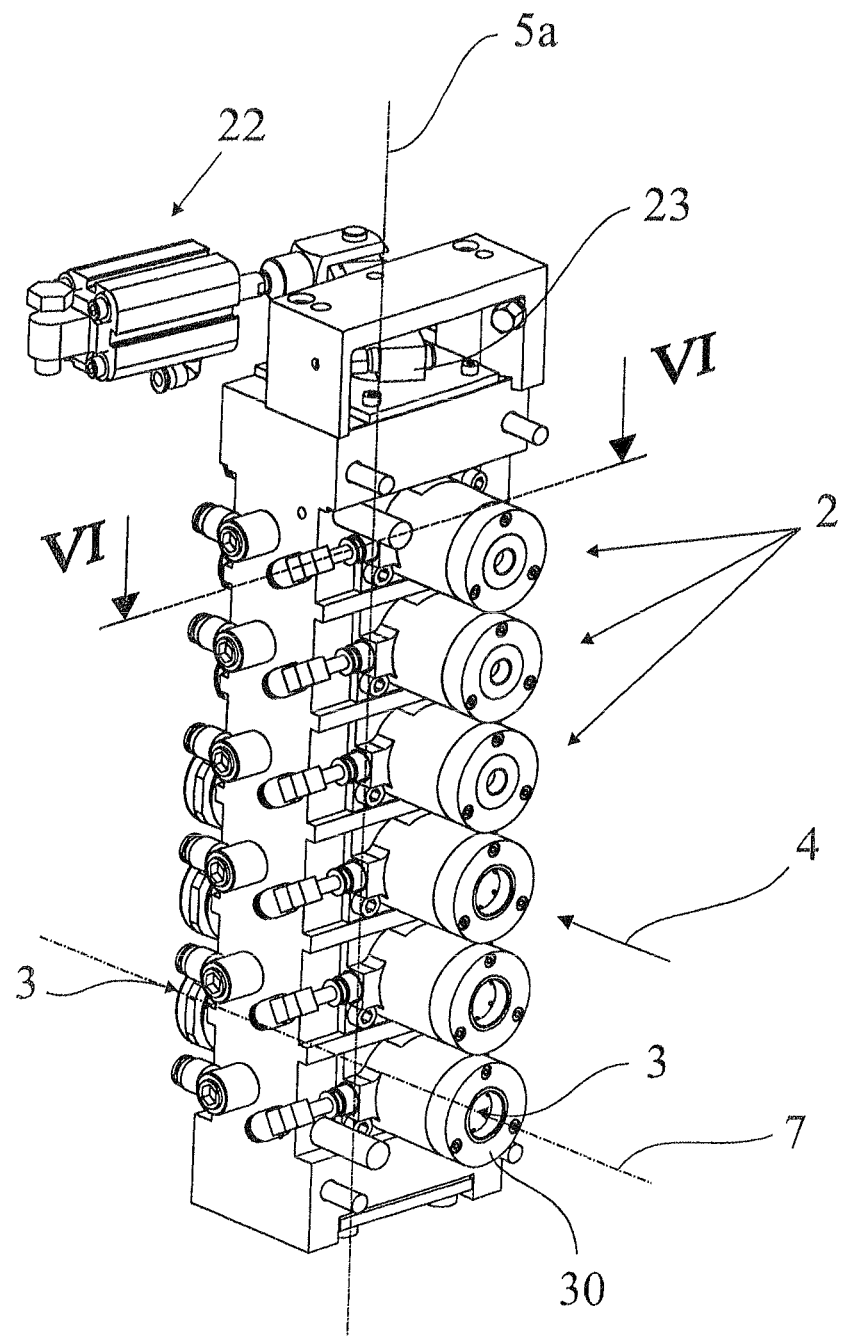
FIG. 5 shows the rivet control of the transfer carriage according to FIG. 4, in a perspective view.
Figure 6:
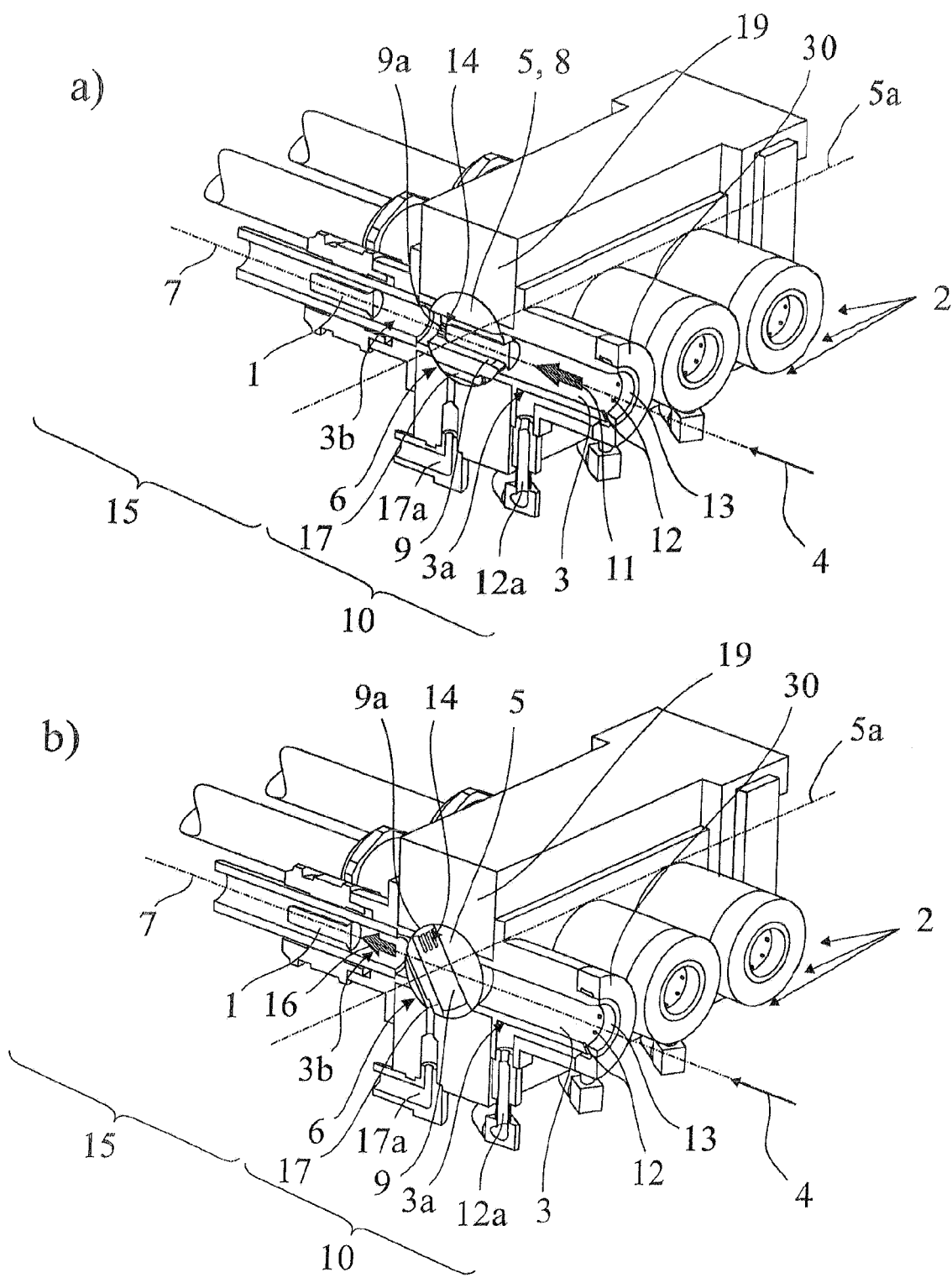
FIG. 6 shows the rivet control according to FIG. 5 in a sectional view along section line VI-VI a) in the pass-through position and b) in the blocking position.
Figure 7:
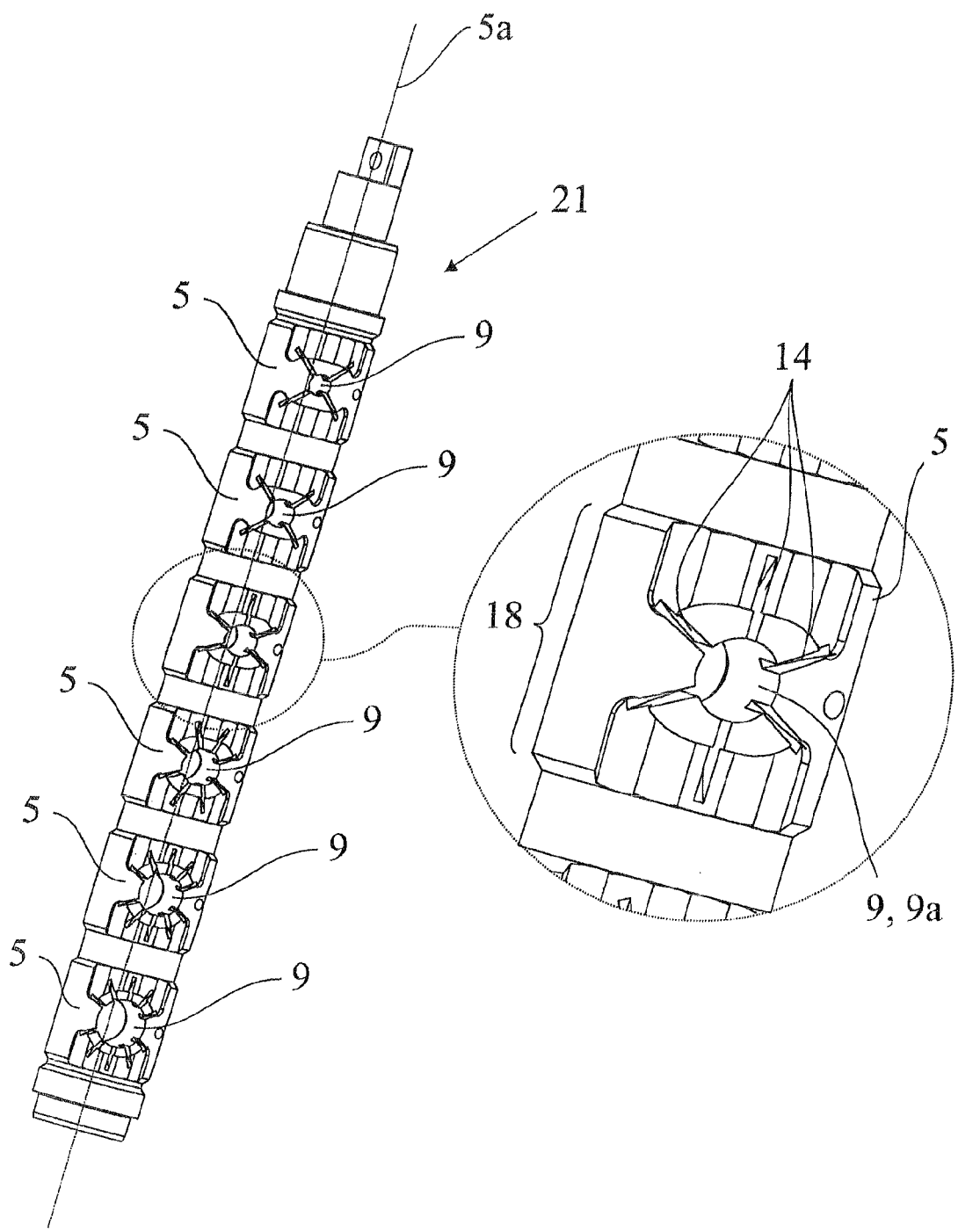
FIG. 7 shows the control shaft of the rivet control according to FIG. 5, in a perspective view.

FIG. 5 to 7 show a preferred rivet control which is used here and preferably in the device for providing rivets R depicted in FIG. 1 to 4. The rivet control is basically modular and comprises at least one rivet control unit 2, i.e. a total of six rivet control units 2 in this case. The design of a rivet control unit 2 is shown in the depictions according to FIG. 6. For simplicity, only one rivet control unit 2 is discussed in the following. All embodiments of this rivet control unit 2 apply for all further rivet control units 2 of the rivet control.

In the installed state, the rivet control is connected into the rivet material flow. To this end, each rivet control unit 2 is equipped with a rivet channel 3 through which particular rivet elements 1 can be pushed.

The transport of rivet elements 1 takes place here and preferably via a fluid flow which is introduced into the particular section of rivet channel 3. In the simplest case, the fluid is air.

The rivet channel 3 comprises an inlet section 3a for receiving rivet elements 1, and an outlet section 3b. Rivet elements 1 therefore travel in conveyance direction 4 from inlet section 3a to outlet section 3b and, from there, to the particular rivet application.

Rivet control unit 2 of the rivet control comprises a control shaft 5 which extends through rivet channel 3 in a control region 6 between inlet section 3a and outlet section 3b. Basically, control shaft 5 can extend through only a portion of rivet channel 3. Here, and preferably, rivet channel 3 is extended through in entirety, preferably substantially transversely to rivet channel longitudinal axis 7.

Finally, control shaft 5 functions here in the manner of a shutoff valve. Accordingly, control shaft 5 provides a connection section 8 between inlet section 3a and outlet section 3b, which is open for rivet elements 1 and fluid in the pass-through position depicted in FIG. 6a. In contrast, FIG. 6b shows that control shaft 5, in a blocking position, substantially blocks the passage of rivet elements 1 and/or fluid between inlet section 3a and outlet section 3b.

To attain the pass-through position and the blocking position in regard to design, it is provided that control shaft 5 has a rivet channel pass-through bore 9 depicted in FIG. 6, the cross section of which substantially corresponds to the cross section of rivet channel 3 in inlet section 3a and/or in outlet section 3b. Depending on the position of control shaft 5, rivet channel pass-through bore 9 provides above-described connection section 8 between inlet section 3a and outlet section 3b of rivet channel 3, or rivet channel pass-through bore 9 blocks the passage of rivet elements 1 and/or fluid between inlet section 3a and outlet section 3b.

The function of rivet control unit 2 is not limited to the pure function of a shutoff valve, however. Instead, rivet control unit 2 comprises a transfer conveyor device 10 which serves to convey a rivet element 1 from inlet section 3a into outlet section 3b using a transfer fluid flow 11 (FIG. 6a). To this end, transfer conveyance device 10 comprises a plurality of fluid channels 12 which communicate with inlet section 3a of rivet channel 3 and can be created via transfer fluid flow 11. To this end, fluid channels 12 are coupled to a corresponding fluid supply 12a. The direction of transfer fluid flow 11 is determined by the orientation of fluid channels 12, which is shown in the depiction according to FIG. 6.

It has been shown that, in combination with conical opening 13 of inlet section 3a, transfer fluid flow 11 creates an underpressure in the region of conical opening 13 in the manner of the Venturi effect, thereby suctioning in rivet element 1 located in front of opening 13.

A certain fluid volumetric flow rate must be ensured to transport rivet elements 1 effectively. To this end, transfer conveyance device 10 comprises at least one ventilation opening 14 in the region of control shaft 5, via which at least a portion of transfer fluid flow 11 flows out. In a variant that is structurally particularly simple, control shaft 5 comprises a number of ventilation grooves 14 which lead into an outlet opening 9a of rivet channel pass-through bore 9 (FIG. 6, 7).

Furthermore, rivet control unit 2 is equipped with a transport conveyance device 15 for the further transport of a rivet element 1 from outlet section 3b to the rivet application using a transport fluid flow 16. Rivet element 1 is transported in the configuration shown in FIG. 6b).

In regard to fluid flow, control shaft 5 can provide a different seal in the blocking position, as indicated above. Here, and preferably, control shaft 5 is equipped with a sealing surface 18 which serves as a seal with respect to housing 19 of rivet control unit 2.

FIG. 7 shows that, in the embodiment that is depicted and preferred, a plurality of control shafts 5 have been combined to form one control shaft 21. This accounts for the fact that, in this case, at least two adjacently disposed rivet control units 2, specifically a total of six adjacently disposed rivet control units 2 are provided, wherein control shafts 5 of rivet control units 2 are each provided by an axial section of common control shaft 21.

The device for providing rivets R according to the invention, which is depicted in FIG. 1 to 4, is now equipped preferably with an above-described rivet control described above, in a manner described above.

Figure 2:
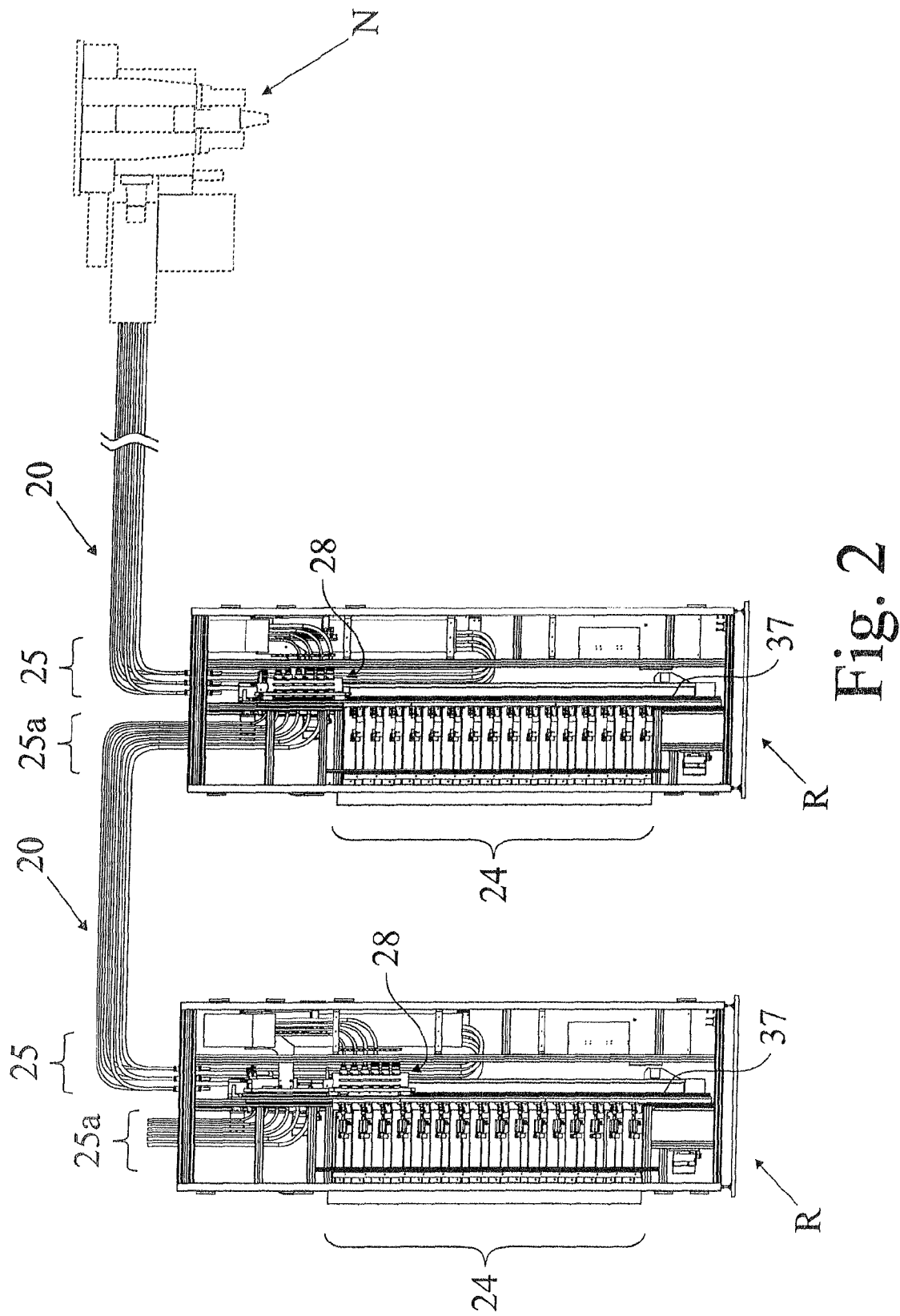
FIG. 2 shows two serially connected devices for providing rivets according to FIG. 1 during operation with one schematically depicted rivet tool, both in a side view.

As likewise explained above, the device for providing rivets R serves to provide rivet elements 1 or the like for at least one rivet application. As indicated in FIG. 2, the rivet application is performed by an automated rivet tool N. FIG. 2 also shows that two devices for providing rivets R are connected in series, as described below.

The device for providing rivets R comprises a rivet storage unit 24 in which preferably different rivet elements 1 can be stored. The device for providing rivets R also comprises at least one rivet outlet 25, i.e. a total of 6 rivet outlets 25 in this case.

In this case, the rivet storage unit 25 is equipped, in the manner of a cartridge cabinet, with at least two stacked rivet cartridges 26 which are replaceable, each of which comprises at least one output flange 27 or the like for dispensing rivet elements 1. Output flange 27 of rivet cartridge 26 can have different configurations. In this case, and preferably, output flange 27 is tubular, as shown in the depiction in FIG. 3 a).

In a particularly preferred embodiment, a transfer carriage 28 is also provided, which comprises an above-described rivet control comprising a plurality of rivet control units 2 in this case and preferably. Rivet control units 2 are designed to accommodate different rivet elements 1, thereby ensuring that the appropriate rivet control unit 2 is used depending on which rivet element 1 should be transferred.

In order to orient the appropriate rivet control unit 2 to the particular desired rivet cartridge 26, transfer carriage 28 is movable along rivet cartridge 26 in stacking direction 29 thereof. A rivet control unit 2 of the rivet control can therefore be oriented toward a rivet cartridge 26 to transfer a rivet element 1 from particular rivet cartridge 26 to particular rivet control unit 2.

Two positions of transfer carriage 28 are shown in FIG. 2. Output sections 3b of rivet control units 2 are connected to above-described rivet outlets 25. Furthermore, each rivet control unit 2 comprises an input flange 30 assigned to input section 3a of rivet channel 3 to receive rivet elements 1, wherein output flange 27 on the rivet cartridge side and input flange 30 on the rivet control side are separated by a gap when a rivet element 1 is transferred.

A form-fit connection of any type therefore does not occur between the two flanges 27, 30. FIG. 4 shows, in the detailed depiction at the bottom, how output flange 27 on the rivet cartridge side is positioned relative to the rivet control and input flanges 30 located there. Due to the fact that a gap is always present between output flanges 27 on the rivet cartridge side and input flanges 30 on the rivet control side, it is sufficient to move transfer carriage 28 and the rivet control overall with only one degree of freedom. To ensure flawless transfer, it has proven advantageous for the gap to lie in a range between approximately 0.2 mm and approximately 0.6 mm. A gap width of approximately 0.4 mm is particularly preferred in this case.

It has already been mentioned that different rivet cartridges 26 preferably store rivet elements 1 having different dimensions, at least in part, wherein transfer carriage 28 therefore comprises a plurality of rivet control units 2 adapted to the different dimensions. The adaptation of rivet control units 2 mainly relates to the diameter of rivet channel 3 and the related connectors, as shown in the detailed depiction at the top in FIG. 4, for instance.

A transfer of a rivet element 1 from a rivet cartridge 26 is explained in the following as an example.

First, transfer carriage 28 orients one of the rivet control units 2 toward the desired rivet cartridge 26, and so the input flange 30 on the rivet control side is centered on output flange 27 on the rivet cartridge side. A separating device (not depicted) provided in rivet cartridge 26 then releases a single rivet element 1 which passes through the gap between the two flanges 27, 30 and is received by input section 3a of rivet control unit 2. To this end, transfer conveyance device 10 is activated in a timely manner, and so rivet element 1 is drawn into input section 3a via the above-mentioned Venturi effect, and is then conveyed into output section 3b via transfer fluid flow 11. Control shaft 21, which has been situated in the pass-through position until now, is then transferred to the blocking position (transition from FIG. 6a to FIG. 6b). Finally, transport conveyance device 15 is activated, and so rivet element 1 is conveyed further via the build-up of a pressure wave via fluid channel through bore 17 to rivet tool N via tube line 20.

An interesting aspect is that the device for providing rivets R is designed such that it can be connected in series to a further device for providing rivets R (FIG. 2). In addition to rivet outlet 25, at least one rivet inlet 25a is provided for this purpose, wherein the arrangement is designed such that a rivet element 1 provided at rivet inlet 25a can be passed to rivet outlet 25. One rivet tool N can therefore be supplied with rivet elements 1 by a plurality of devices for providing rivets R without the need to provide any type of conveyance switch between the devices for providing rivets R and rivet tool N.

A decisive aspect of the teaching according to the invention is the particular manner for fixing rivet cartridges 26—which can be replaced on front side 31 of the device for providing rivets R, inter alia, using a handle 32—in their particular operating positions without the need for an above-described transfer carriage 28.

As described above, the device for providing rivets R is used to provide rivet elements 1 from rivet storage unit 24 via at least one rivet outlet 25 for at least one rivet tool N, wherein rivet storage device 24 comprises at least two upper, stacked, replaceable rivet cartridges 26, each of which has at least one output flange 27 or the like for dispensing rivet elements 1.

A cartridge guide 26a and a releasable cartridge lock 26b are assigned to each rivet cartridge 26, wherein a rivet cartridge 26, for installation thereof, can be slid via cartridge guide 26a to an operating position, where it can be fixed using cartridge lock 26b. Cartridge guide 26a and cartridge lock 26b are shown in FIGS. 1 and 3.

It is essential that cartridge lock 26b is assigned to cartridge guide 26a, as shown in the depictions according to FIG. 3, and can be engaged with rivet cartridge 26 for locking.

Cartridge lock 26b therefore rests against cartridge guide 26a which, due to the guidance properties thereof, is designed with minimal tolerances. This forms the prerequisite for attaining the most exact locking position possible (operating position). Given that cartridge lock 26b always assumes a defined position relative to rivet cartridge 26 due to the placement thereof on cartridge guide 26a, it is not necessary to perform complex adjustments of cartridge lock 26b upon installation.

Attaining the exact operating position is particularly significant when the aim is to assign an above-described transfer carriage 28 to rivet cartridges 26. Provided, furthermore, that the above-described configuration should be provided with a gap between rivet cartridge-side output flange 27 and rivet control-side input flange 30, the width of which moves in the 1/10 mm range, attaining the operating position exactly is even necessary to function.

FIGS. 1 and 3 show a particularly simple design of cartridge lock 26b which meets the most stringent accuracy requirements. The reason for this is that cartridge lock 26b presses rivet cartridge 26 in the locked state against a stationary cartridge stop 33, wherein, in this case and preferably, pressing direction 34 corresponds to the sliding-in direction of rivet cartridge 26.

A number of possibilities are feasible for the design of cartridge stop 33. In this case and preferably, stationary cartridge stop 33 is in the form of a mounting flange 35, through which output flange 37 of particular rivet cartridge 26 extends at least in part (see FIG. 3a in combination with FIG. 4, detailed depiction at the bottom). In the embodiment shown, which is preferred, output flange 27 of rivet cartridge 26 has been equipped with a circumferential collar 36 which forms a counterstop for mounting flange 35.

The use of output flange 27 of rivet cartridge 26, which is present anyway, is structurally efficient. It is also advantageous in regard to tolerances since mounting flange 25 is a reference position, to a certain extent, relative to the position of transfer carriage 28.

Particularly good results in terms of reducing tolerances can be achieved, as depicted here, by providing a mounting flange 37 on which cartridge guide 26a and cartridge stop 33 or mounting flange 35 are disposed. It is therefore possible, in the locked state, to attain an approximately closed power flow between cartridge guide 26a, cartridge lock 26b, output flange 27 of rivet cartridge 26, cartridge stop 33 and mounting flange 35 and supporting plate 37. When the configuration is suitable, the resulting tolerances in terms of assuming the operating position are correspondingly small.

Given that, in the embodiment which is shown and preferred, the exact positioning of output flange 27 of rivet cartridge 26 relative to transfer carriage 28 is crucial, it is advantageously provided that transfer carriage 28 is also disposed on supporting plate 37. As shown in the depiction according to FIG. 4, transfer carriage 28 moves on two rails 38 which are attached to the side of supporting plate 37 facing away from rivet cartridges 26.

Preferably, cartridge lock 26b can be actuated using a motor. In the simplest case, a linear actuator 39 which is preferably a pneumatic actuator is assigned to cartridge lock 26b. Pneumatic actuator 39 is coupled at one end to cartridge guide 26a, and at the other end to a locking mechanism 40. This is shown clearly in the depictions according to FIG. 3.

Locking mechanism 40 also has a particularly simple design in the embodiment shown. Locking mechanism 40 comprises only one pivotable locking lever 41 which is preferably hingedly connected to cartridge guide 26a. Pivot axis 42 of locking lever 41 extends substantially vertically.

In the unlocked state, locking lever 41 lies outside the range of motion of rivet cartridge 26, thereby enabling rivet cartridge 26 to be easily slid out of cartridge guide 26a. For locking, actuator 39 causes locking lever 41 to swivel such that a projection 43 of locking lever 41 engages with rivet cartridge 26, i.e. a part of output flange 27 of rivet cartridge 26 in this case. For this engagement, output flange 27 of rivet cartridge 26 is equipped with a further collar 44, as shown in FIG. 3a.

Numerous possibilities are feasible for the position of actuator 39. Depending on the basic structural conditions, it may also be advantageous, for example, to place actuator 39 on the side of supporting plate 37 facing transfer carriage 28.

It will be understood that each of the elements described above, or two or more together, may also find a useful application in other types of constructions differing from the types described above.

While the invention has been illustrated and described as embodied in a device for providing connection elements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A device for providing rivets, comprising:
    a rivet storage unit with at least one rivet outlet for at least one rivet application, said the rivet storage unit including at least two stacked, replaceable rivet cartridges each having at least one output flange for dispensing rivet elements; and
    a cartridge guide and a detachable cartridge lock assigned to each of said rivet cartridges and configured so that a rivet cartridge for installation is slidable via said cartridge guide to an operating position and fixable using said cartridge lock;
    wherein said cartridge lock is assigned to said cartridge guide and is engagable with the rivet cartridge for locking, and
    wherein said cartridge lock has a linear actuator which is coupled at one end to said cartridge guide and at another end to a locking mechanism.

2. The device for providing rivets as defined in claim 1, further comprising a transfer carriage with at least one rivet control for receiving and further transporting the rivet elements, wherein said transfer carriage is movable along said rivet cartridge in a stacking direction thereby enabling said at least one rivet control to be oriented toward said rivet cartridge to transfer the rivet element from a corresponding one of said rivet cartridges to said at least one rivet control.

3. The device for providing rivets as defined in claim 1, wherein said cartridge lock is configured to press said rivet cartridge in a locked state against a stationary cartridge stop.

4. The device for providing rivets as defined in claim 3, wherein said cartridge lock presses said rivet cartridge in the locked state against said stationary cartridge stop in a pressing direction which corresponds to a sliding-in direction.

5. The device for providing rivets as defined in claim 3, wherein said stationary cartridge stop is a mounting flange through which an output flange of a respective one of said rivet cartridges extends at least in part.

6. The device for providing rivets as defined in claim 5, wherein said cartridge lock in a lock state presses a component against said mounting flange.

7. The device for providing rivets as defined in claim 6, wherein said component is a circumferential collar of said output flange.

8. The device for providing rivets as defined in claim 2, further comprising a supporting blade on which said cartridge guide, said cartridge stop, and said transfer carriage are disposed.

9. The device for providing rivets as defined in claim 1, wherein said linear actuator is a pneumatic actuator.

10. The device for providing rivets as defined in claim 1, wherein said locking mechanism has a pivotable locking lever supported on said cartridge guide and pivotable via said actuator into engagement with said rivet carriage.

11. The device for providing rivets as defined in claim 10, wherein said pivotable locking lever is hingedly supported on said cartridge guide.

12. The device for providing rivets as defined in claim 10, wherein said pivotable locking lever is pivoted via said actuator into engagement with a component of an output flange of said rivet carriage.

* * * * *